United States Patent [19]
Nishida et al.

[11] Patent Number: 5,677,900
[45] Date of Patent: Oct. 14, 1997

[54] METHOD AND APPARATUS FOR REPLACING A SELECTED FILE WITH ANOTHER LONGER OR SHORTER FILE WITH NO PORTION OF THE SELECTED FILE REMAINING

[75] Inventors: Syuzo Nishida; Yukihiko Haikawa; Takeshi Tanaka; Yukiharu Hosono; Hidenori Minoda, all of Higashihiroshima; Yoshihiro Okamoto, Matsuyama, all of Japan

[73] Assignee: Sharp Kabushiki Kaisha, Osaka, Japan

[21] Appl. No.: 684,871

[22] Filed: Apr. 15, 1991

[30] Foreign Application Priority Data

| Apr. 17, 1990 | [JP] | Japan | 2-102640 |
| Apr. 17, 1990 | [JP] | Japan | 2-102641 |
| Apr. 17, 1990 | [JP] | Japan | 2-102642 |

[51] Int. Cl.$^6$ ............................ G11B 5/09; G11B 27/02
[52] U.S. Cl. ................................ 369/48; 360/13
[58] Field of Search ........................ 360/48, 13, 8; 369/48, 44.26, 47, 49, 53, 54, 58, 32, 30

[56] References Cited

U.S. PATENT DOCUMENTS

| 4,584,616 | 4/1986 | Allen | 360/48 |
| 4,761,693 | 8/1988 | Higashi et al. | |
| 4,899,232 | 2/1990 | Odaka et al. | 360/48 |

FOREIGN PATENT DOCUMENTS

| 0 195 324 | 9/1986 | European Pat. Off. |
| 0 208 556 | 1/1987 | European Pat. Off. |
| 0 310 089 | 4/1989 | European Pat. Off. |
| 51-43908 | 4/1976 | Japan. |
| 1-292674 | 11/1989 | Japan. |

*Primary Examiner*—P. W. Huber
*Attorney, Agent, or Firm*—Nixon & Vanderhye P.C.

[57] ABSTRACT

In a data recording apparatus which sequentially records recording data on a magnetic tape (T), when a plurality of continuously recorded data files F(i) are rewritten into new data files F(I) having smaller data quantities, recording areas which remain without being rewritten into the new data files F(I) are rewritten into unrecorded areas NR containing no data. Further, when rewriting into new data files G(I) which have larger data quantities, reserve areas SP are provided, in which data has not been previously recorded, and overflow data is written into the reserve areas SP at the time of rewriting. Furthermore, when rewriting into a new data file H(I) having a larger quantity, in a case where the data file H(i+1) following the rewritten data file H(i) is not needed, the recording areas of the unnecessary data file H(i+1) which are not rewritten, are rewritten into a new data file H(I+1) having no data, or are rewritten into the above mentioned reserve areas SP belonging to a newly rewritten data file A(I).

7 Claims, 12 Drawing Sheets

METHOD AND APPARATUS FOR REPLACING A SELECTED FILE WITH ANOTHER LONGER OR SHORTER FILE WITH NO PORTION OF THE SELECTED FILE REMAINING

BACKGROUND OF THE INVENTION

1. Field of the Invention

The present invention relates to a method and apparatus for data recording which may be suitably implemented in a sequential access type data recording/reproducing apparatus having a recording medium such as the spiral track of an optical disc or a magnetic tape.

2. Description of the Prior Art

Figure 11:
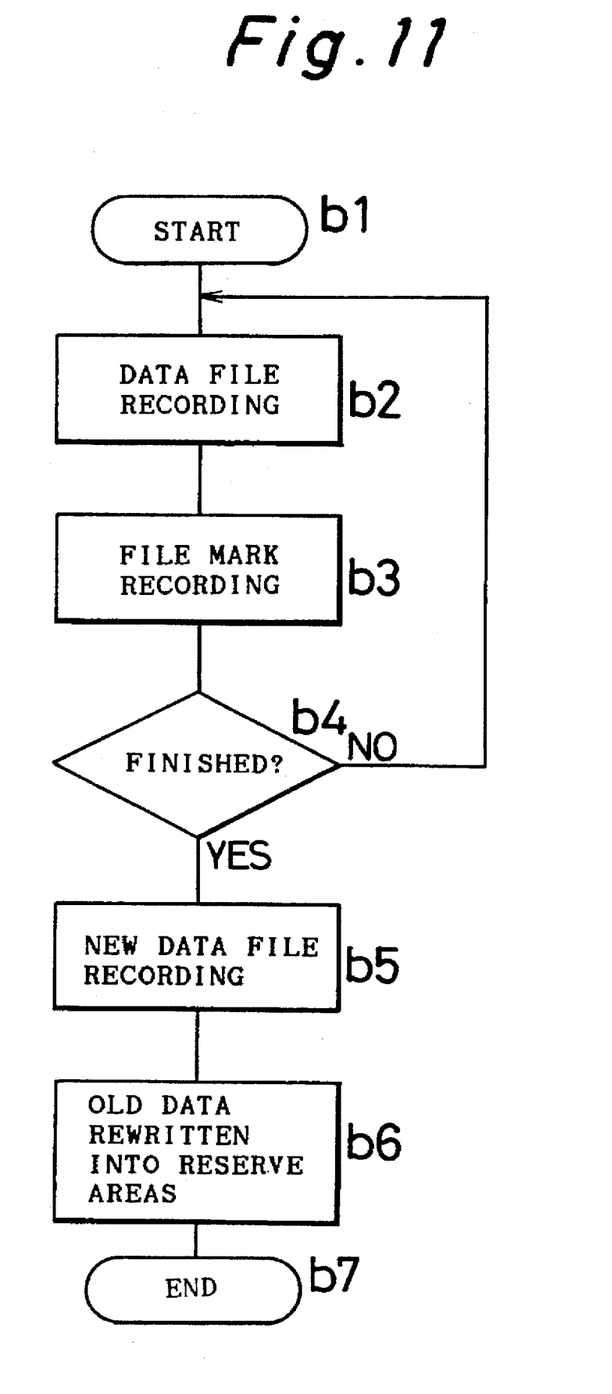

In the case of a sequential access type data recording/reproducing apparatus which reads out the object data in the order of recording, the recording of data to the recording medium, such as a magnetic tape, is generally performed as shown in FIG. 1(1).

In other words, FIG. 1(1) is a schematic diagram showing the arrangement of the data recorded on a magnetic tape T by the above mentioned data recording/reproducing apparatus. Each of the data files B(i−1), B(i) and B(i+1) represent collections of related data. Recorded areas containing file marks M, which indicate the separation between these data files, are provided between the recorded area of each data file and the recorded area of the next data file.

Each of the data files is comprises of a plurality of data blocks, having as their components clusters of data (hereinafter referred to as data blocks) to which parity has been added for detection/correction of errors. For example, the data file B(i) is comprised of six data blocks Di0, Di1, Di2, Di3, Di4 and Di5, which are recorded in this order on the magnetic tape T.

Figure 12:
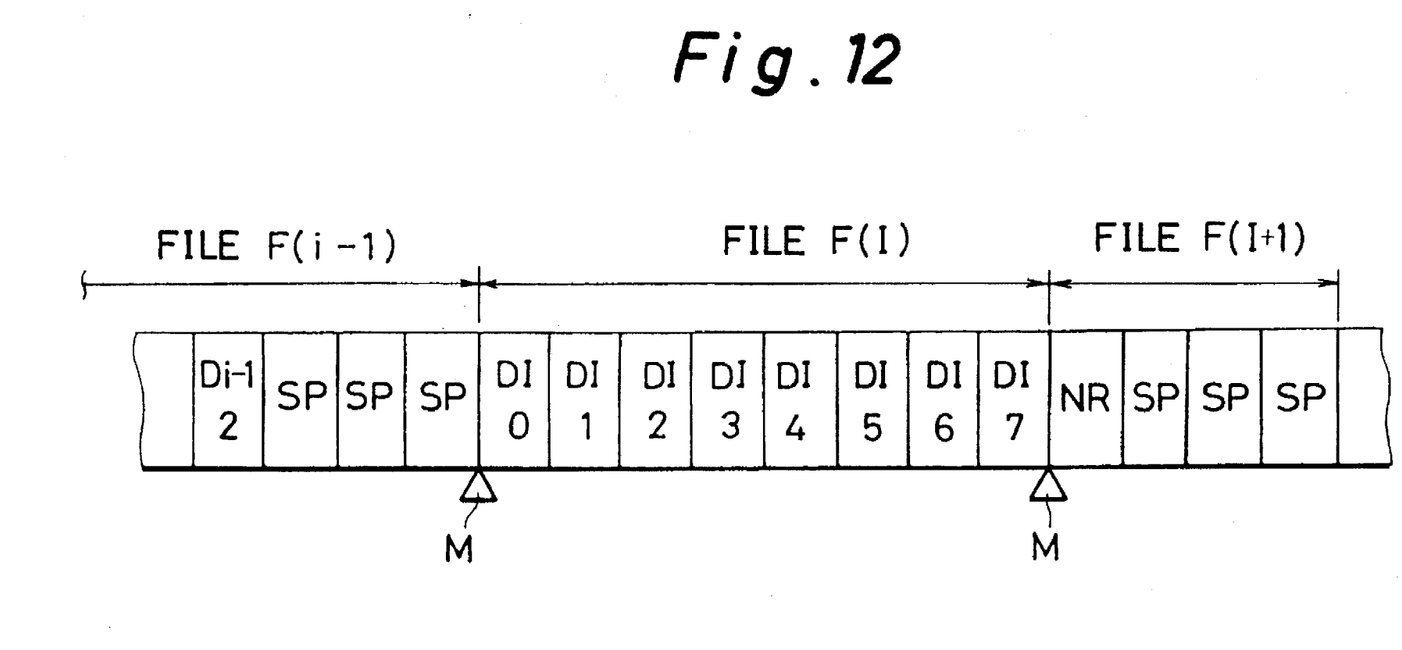

Further, when a data file is freely selected from among the recorded data files, for example data file B(i), and it is rewritten into a data file B(I) having a smaller quantity of data, the recorded data on the magnetic tape T is arranged as shown by the schematic diagram in FIG. 1(2).

In other words, the data blocks Di0 through Di3, from within the data file B(i) prior to rewriting, are rewritten into the four data blocks DI0 through DI3 which comprise the new data file B(I), and the remaining two data blocks, Di4 and Di5, from the data file B(i) prior to rewriting, are retained in the form of old data.

On the other hand, when the data file B(I), which was rewritten as shown in FIG. 1(2), is read by the above mentioned data recording/reproducing apparatus, it is controlled by means of reference to a directory at the beginning of the magnetic tape T, so that is does not read the old data blocks Di4 and Di5. Information such as the data file location and number of data blocks is recorded in this directory to serve as a recording area for retrieving each of the data files.

However, when as mentioned above, a data file is rewritten into a data file which contains a smaller quantity of data, the old data which is not rewritten is retained as it is. Then, for example, there are cases in which the error rate increases when the directory data is read at the time of reproduction, and defects appear in the data because correction becomes impossible. Also, in cases such as when a defect occurs in the directory and certain data cannot be read, the data recording/reproducing apparatus becomes unable to control the discrimination of the data blocks to be read, DI0 through DI3, and the data blocks which are not to be read, Di4 and Di5. Hence, there is a problem because of the reading of unnecessary data and so forth, and the rewritten data file B(I) ultimately becomes unusable.

Further, when using the above mentioned recording method, it is necessary to distinguish between the data blocks to be read and the data blocks which are not to be read, in order to retrieve the required data file. This also causes a problem because directory data becomes necessary, and in a case when a recording medium such as magnetic tape is used, that much more time is required to retrieve data files.

Figure 1:
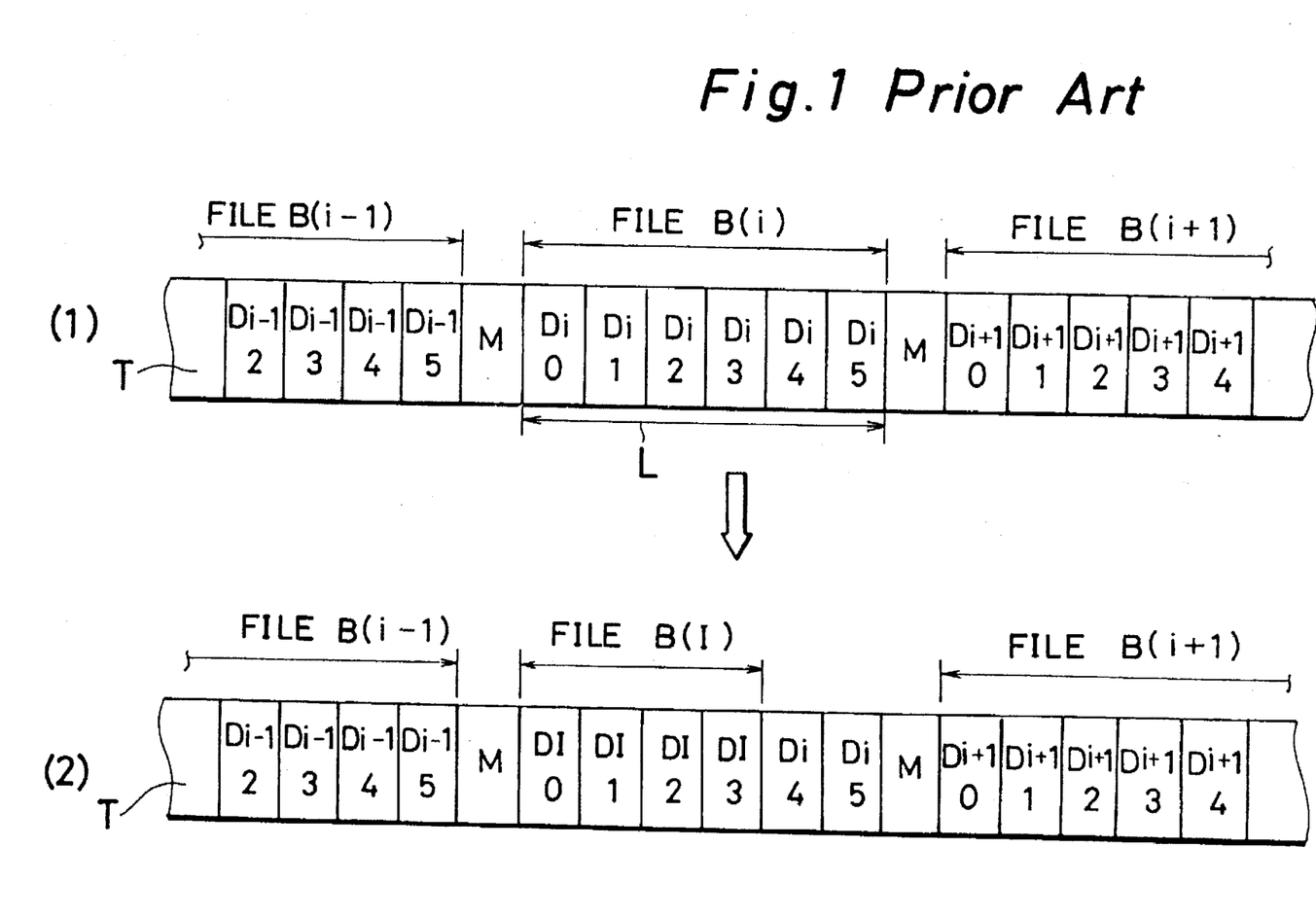

Further, in the general recording method shown in the above mentioned FIG. 1, recording is performed sequentially with the next data inserted immediately after the preceding data and without any reserve areas provided among the recording areas. For this reason, when it is desired to rewrite recorded data from the middle of this magnetic tape T, for example data file B(i), even to another data file which contains the same quantity of data, there may be cases when this rewriting is impossible.

In other words, when rewriting of the above mentioned data file B(i) is performed by read-after-write recording, a check is performed to verify whether the data written by the recording head is correctly written by reading with the reproducing head which follows the recording head. If there is a defective area having a scratch, etc. in part of the recording area of the magnetic tape T, then when an error is detected in a data block written into this defective area, the defective area is skipped over and the same data block is written once again. Then continuing from there, the following data blocks are written in sequence. As a result, the quantity of data in the newly rewritten data file, that is the file length, becomes even longer than the file length L of the data file B(i) prior to rewriting, to the extent of the defective area. This leads to a situation wherein the file mark corresponding to that data file is written on top of the next data file B(i+1).

Figure 2:
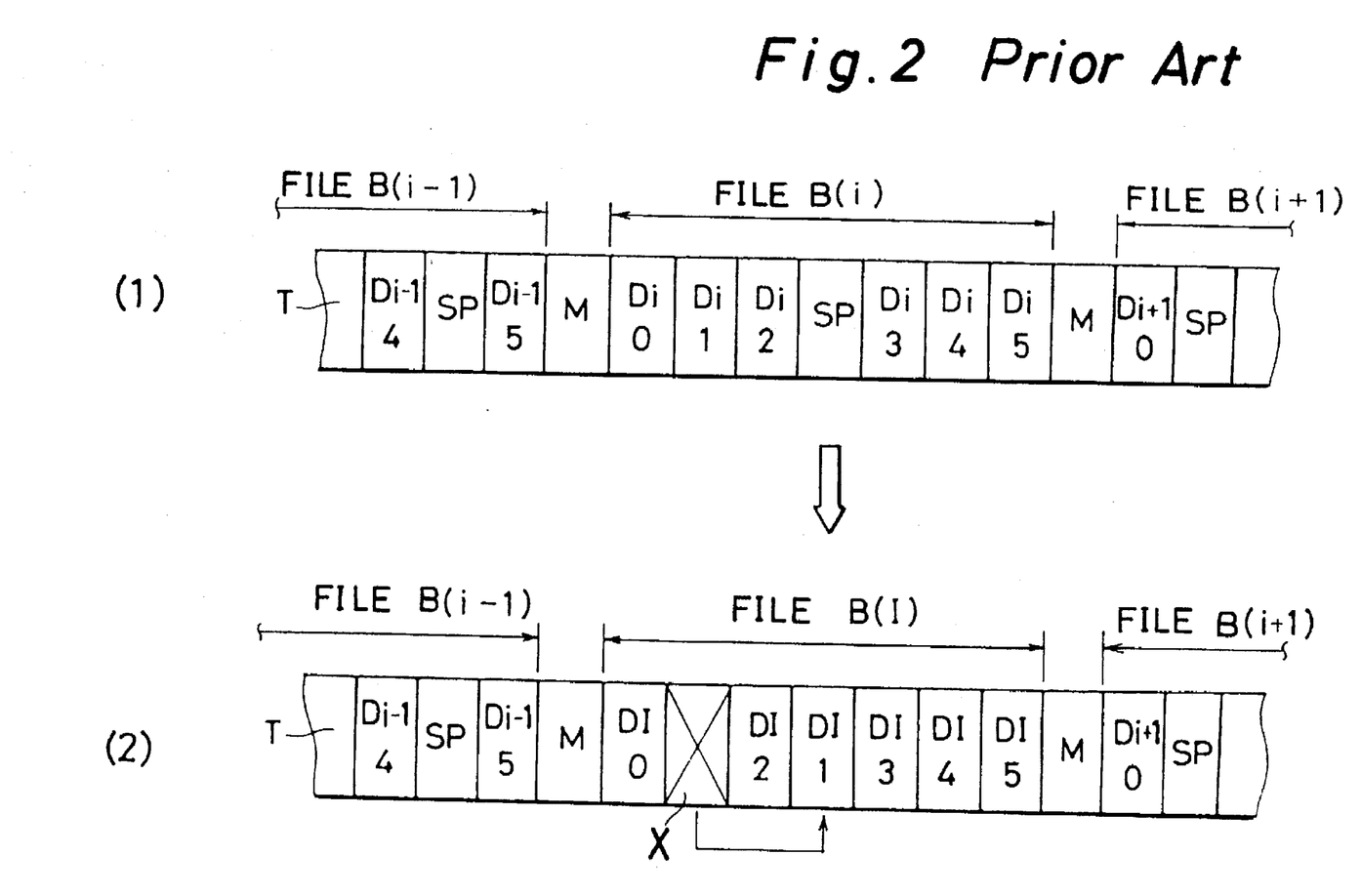

However, a data recording method which eliminates this kind of drawback is known in the prior art. As shown in FIG. 2, for example, this method provides reserve areas SP, into which nothing is written, among the recording areas of the magnetic tape T.

FIG. 2(1) is a schematic diagram showing the arrangement of data on the magnetic tape T prior to the rewriting of data, and FIG. 2(2) is a schematic diagram showing the arrangement of data after the rewriting of data.

In other words, the reserve areas SP are provided at intervals of every five data blocks on the magnetic tape T prior to the rewriting of data. In a case where the data file B(i) is rewritten into another data file B(I) as shown in FIG. 2(2), and for example, the recording area into which the data block DI1 is to be written is a defective area X having a scratch etc., then when an error is detected in the recording of the defective area X by the reading action of the reproducing head, the data block DI1 in which the error was detected is rerecorded in the following reserve area SP.

By proceeding in this way in the above mentioned data recording method of the prior art, the new data file B(I) is recorded without overlapping the next data file B(i+1).

However, when it is desired to rewrite data from a data file using the data recording method shown in the above mentioned FIG. 2, rewriting is not possible unless the data quantity of the data file to be newly written is the same or shorter than the data file prior to rewriting.

In other words, when a data file is updated such that it has a data quantity greater than the originally recorded data file B(i), there is a problem because the recording areas of the data file B(i+1), which follows the data file B(i) that is to be rewritten, and the file mark M and so forth, are destroyed.

Furthermore, in the data recording method shown in the above mentioned FIG. 2, when for example, it is desired to rerecord a data file B(I) having a data quantity greater than that of the originally recorded data file B(i), the recording areas of the file mark M and the data file B(i+1) etc., which follow the recording area of the data file B(i) that is to be rewritten, will also be rewritten. However, even if it is supposed that the next data file B(i+1) is unnecessary data, the following kind of problem occurs.

For example, the old data which is not rewritten into the new data file B(I) is retained, as it is, in the data file B(i+1) which follows the data file B(i) that is to be rewritten. Because of this, when the rewritten data file B(I) is reproduced, a situation occurs through the reading and so forth of the unnecessary old data, wherein the data file B(I) ultimately becomes unusable. That is to say, when the data file B(I) is read, control is performed so that the remaining old data will not be read, by referring to the directory at the beginning of the magnetic tape. Information such as the locations of data files and the number of data blocks is recorded in this directory, which serves as a recording area for the retrieval of each data file. However, a case such as that where a defect occurs in the directory and that data cannot be read, results in the reading of the unnecessary old data, and the new data file B(I) ultimately becomes unusable.

SUMMARY OF THE INVENTION

It is an object of the invention to provide a data recording method and apparatus which can achieve accurate reading of recorded data without dependence upon directory data.

It is an another object of the invention to provide a data recording method and apparatus which can perform the rewriting of data without the destruction of other data files and so forth, even when the data quantity of the new data file to be rewritten is greater than that of the data file prior to rewriting.

It is a still further object of the invention to provide a data recording method and apparatus which can perform rewriting of data so that it can be reproduced, even when the data quantity of the new data file to be rewritten is greater than that of the data file prior to rewriting.

The invention provides a data recording method for a recording medium used in a sequential access type data recording/reproducing apparatus which reads-out object recorded data in the recorded order, wherein recording areas from among the recording areas of data files prior to rewriting, which are not rewritten into new data files, are rewritten into unrecorded areas where there is no data, at the time when a data file is voluntarily selected from among a plurality of data files, which are collections of related data continuously recorded on a recording medium, and is rewritten into a new data file which has a smaller data quantity.

The invention also provides a data recording apparatus which sequentially records recording data on a recording medium in a recording order, wherein the apparatus comprises means for rewriting recording from among the recording areas of data files prior to rewriting, which are not rewritten into new data files, into unrecorded areas where there is no data, at the time when a data file is voluntarily selected from among a plurality of data files, which are collections of related data continuously recorded on a recording medium, and is rewritten into a new data file which has a smaller data quantity.

In accordance with the invention, when a data file prior to rewriting is rewritten into a data file which has a smaller data quantity, the recording areas of the remaining old data which are not rewritten, are rewritten into unrecorded areas where there is not data. Because of this, control to discriminate between data which may be read and data which should not be read becomes unnecessary when the rewritten data file is read at the time of reproduction. There is no necessity to depend on a directory for this discrimination, and the reading of data can be performed accurately and quickly.

As mentioned above, according to the data recording method of the invention, when a data file prior to rewriting is rewritten into a data file which has a smaller data quantity, the recording areas of the remaining old data which are not rewritten, are rewritten into unrecorded areas where there is no data. Because it is done in this way, control to discriminate between data which may be read and data which should not be read becomes unnecessary when the rewritten data file is read at the time of reproduction. There is no necessity to depend on a directory for this discrimination, and the reading of data can be performed accurately and quickly.

The invention provides a data recording method for a recording medium, such as magnetic tape, used in a sequential access type data recording/reproducing apparatus which reads-out object recorded data in the recording order, wherein unrecorded reserve area are provided following the recording areas of each data file, for every recording of a data file, which is a collection of related data, at the time data is first recorded on the recording medium; and when a voluntarily selected data file recorded on the recording medium is rewritten into another data file having a greater data quantity than this data file, the data which overflows from the data file prior to rewriting is written into the reserve areas.

The invention also provides a data recording apparatus which sequentially records recording data on a recording medium in a recording order, comprising means for providing unrecorded reserve areas following the recording areas of each data file, for every recording of a data file, which is a collection of related data, at the time data is first recorded on the recording medium; and means for writing the data which overflows from the data file prior to rewriting is written into the reserve areas when a voluntarily selected data file recorded on the recording medium is rewritten into another data file having a greater data quantity than this data file.

In accordance with the invention, unrecorded reserve areas are provided after the recording areas of each data file. In the rewriting of data files, even when the data quantity of the new data file which is rewritten is greater than that of the data file prior to rewriting, the surplus data is recorded into the reserve area which comes immediately after the recording area of the data file prior to rewriting. Because of this, the new data file can be recorded within a range which will not overflow from the reserve area.

As mentioned above, according to the data recording method of the invention, when data is first recorded on the recording medium a reserve area is provided after the recording area of each data file. When a data file prior to rewriting is rewritten into a new data file having a greater file length, the surplus data which overflows from the data file prior to rewriting is written into the reserve area. Because it is done in this way, it is possible to avoid the destruction of file marks which have been recorded, and other data files and so forth, through the rewriting of data files.

The invention provides a data recording method for a recording medium used in a sequential access type data recording/reproducing apparatus which reads-out object recorded data in the recorded order, wherein file marks are recorded for every recording of a data file, which is a collection of related data, in order to distinguish each data file from other data files, at the time data is first recorded on a recording medium; when a voluntarily selected data file recorded on the recording medium is rewritten into another data file having a data quantity greater than this data file, the data which overflows from the area of the data file prior to rewriting is written by continuing into the area of the data file which is adjacent to the file mark and the end; the area of that data file at the end which was not rewritten, is rewritten into an unrecorded new data file; or the area of that data file at the end which was not rewritten, is rewritten into an unrecorded reserve area belonging to the new data file which was rewritten.

The invention also provides a data recording apparatus which sequentially records recording data on a recording medium in a recording order, comprises means for recording file marks for every recording of a data file, which is a collection of related data, in order to distinguish each data file from other data files, at the time data is first recorded on a recording medium; means for recording the data which overflows from the area of the data file prior to rewriting by continuing into the area of the data file which is adjacent to the file mark and the end; when a voluntarily selected data file recorded on the recording medium is rewritten into another data file having a data quantity greater than this data file, and means for rewriting the area of that data file at the end which was not rewritten, into an unrecorded new data file; or the area of that data file at the end which was not rewritten, into an unrecorded reserve area belonging to the new data file which was rewritten.

In accordance with the invention, when the data file Fi+1, which follows the data file to be rewritten Fi, is an unnecessary data file, it is possible to rewrite data file FI, which has a greater data quantity than the data file to be rewritten Fi, from data file Fi across to data file Fi+1. The recording area within the data file Fi+1 which is not rewritten and retains old data, is rewritten as an unrecorded reserve area belonging to the new data file FI, or an another unrecorded data file. Because of this, it is possible to correctly read the rewritten data file FI at the time of reproduction, without reading the unnecessary old data.

As mentioned above, according to the data recording method of the invention, the data file FI, which has a greater data quantity than the data file to be rewritten Fi, is rewritten from data file Fi across to data file Fi+1. The recording area within the data file Fi+1 which is not rewritten and retains old data, is rewritten as an unrecorded reserve area belonging to the new data file FI, or an another unrecorded data file. Because it is done in this way, it is possible to correctly read the rewritten data file FI at the time of reproduction, without reading the unnecessary old data.

BRIEF EXPLANATION OF THE DRAWINGS

Other and further objects, features, and advantages of the invention will be more explicit from the following detailed description taken with reference to the drawings wherein:

FIGS. 1(1)–1(2) are schematic diagrams showing the arrangement of data recorded on magnetic tape according to a data recording method of the prior art;

FIGS. 2(1)–2(2) are schematic diagrams showing the arrangement of data recorded on magnetic tape according to another data recording method of the prior art;

FIGS. 4(1)–4(2) are schematic diagrams showing the arrangement of data recorded on magnetic tape according to a data recording method which is one embodiment of the invention;

FIGS. 5(1)–5(2) are flow charts showing the process of that data recording method;

FIGS. 6(1)–6(2) are schematic diagrams showing the arrangement of data recorded on magnetic tape according to a data recording method which is another embodiment of the invention;

FIGS. 7(1)–7(2) are flow charts showing the process of that data recording method;

FIGS. 8(1)–8(2) are schematic diagrams showing the arrangement of data recorded on magnetic tape according to a data recording method which is yet another embodiment of the invention;

FIGS. 9(1)–9(2) are flow charts showing the process of that data recording method;

FIGS. 10(1)–10(2) are schematic diagrams showing the arrangement of data recorded on magnetic tape according to a data recording method which is yet another embodiment of the invention;

FIG. 11 is a flow chart showing the process of that data recording method; and

FIG. 12 is a schematic diagram showing the arrangement of data in yet another embodiment of the invention.

DETAILED DESCRIPTION OF THE PREFERRED EMBODIMENTS

Now referring to the drawings, preferred embodiments of the invention are described below.

Figure 3:
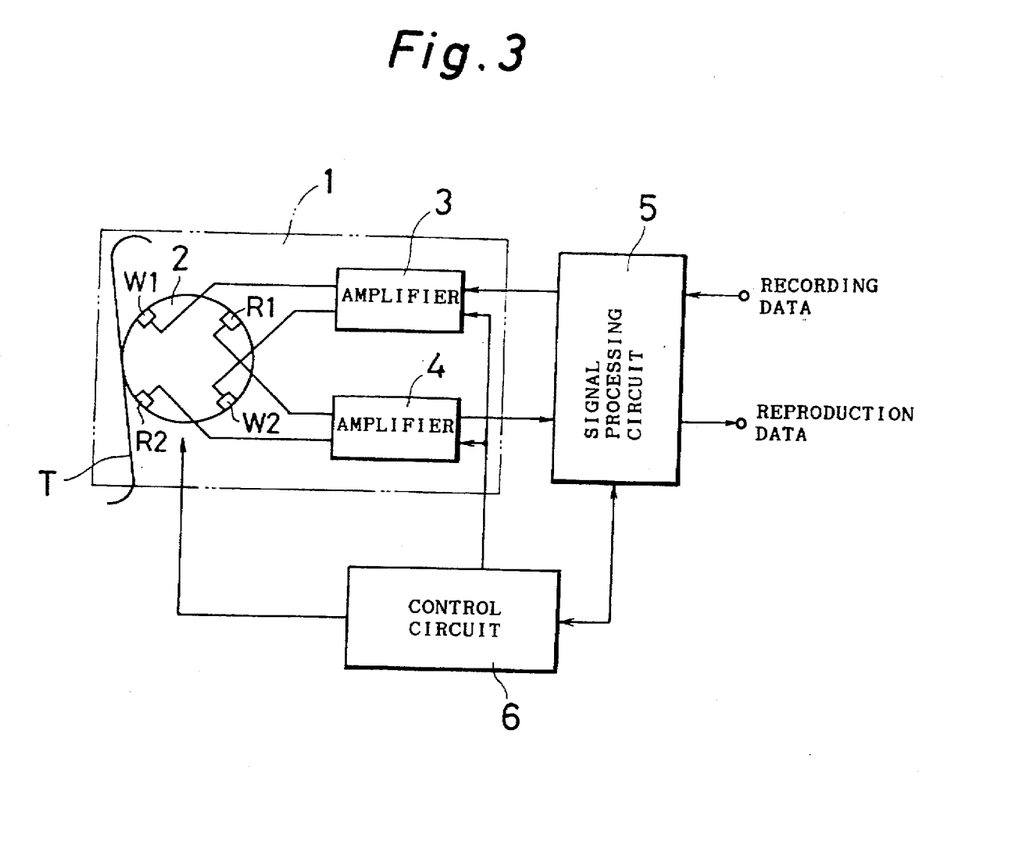
FIG. 3 is a block diagram showing the diagrammatic structure of a data recording/reproducing apparatus in which a data recording method of the invention is implemented.

FIG. 3 is a block diagram showing the diagrammatic structure of a data recording/reproducing apparatus in which a data recording method of the invention is implemented. A write/read circuit 1 is a circuit which includes a rotating drum 2, and amplifiers 3 and 4 etc. A magnetic tape T, which is the recording medium, is sequentially scanned by recording heads W1 and W2, and reproducing heads R1 and R2, which are disposed on the circular surface of the rotating drum 2. Data is sequentially recorded on the magnetic tape T by the scanning of the recording heads W1 and W2, and the recorded data on the magnetic tape T is read by the scanning of the reproducing heads R1 and R2. A signal processing circuit 5 is a circuit which has the function of converting data inputted from outside into signals suitable for recording and supplying them to the above mentioned write/read circuit 1, and the function of converting data read form the magnetic tape T by the write/read circuit 1 into prerecording type signals and outputting them. A control circuit 6 is a circuit for controlling the operational timing etc. of the above mentioned write/read circuit 1 and signal processing circuit 5.

Figure 4:
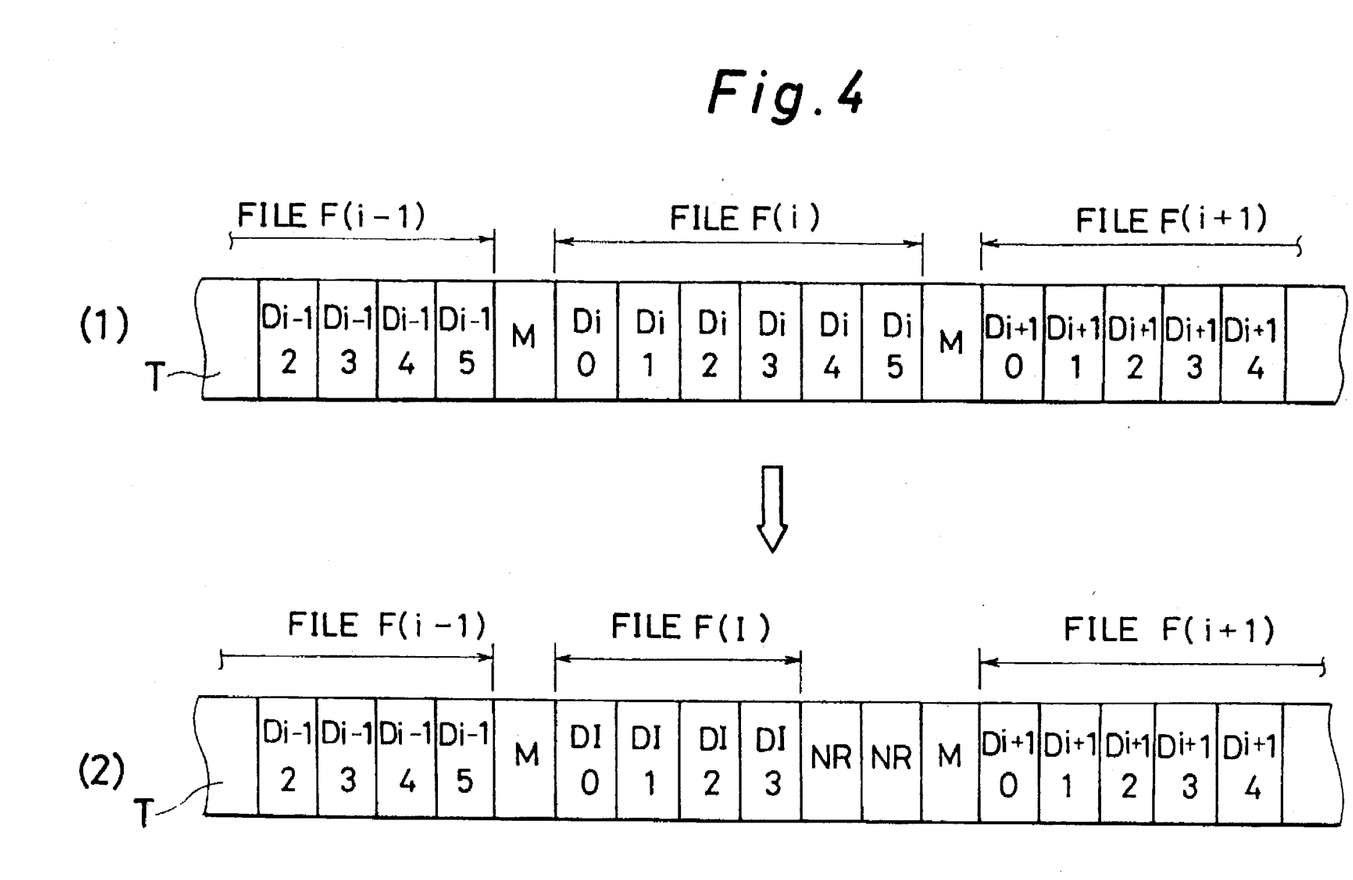

FIG. 4 is a schematic diagram showing the arrangement of data recorded on a magnetic tape T according to a data recording method which is one embodiment of the invention. Within this figure, FIG. 4(1) shows the arrangement of data recorded for the first time on the magnetic tape T, on which no other data has been recorded, and FIG. 4(2) shows the arrangement of data when a voluntarily selected data file F(i), which has been recorded on the magnetic tape T, is rewritten into another data file F(I), which has a smaller data quantity.

Figure 5:
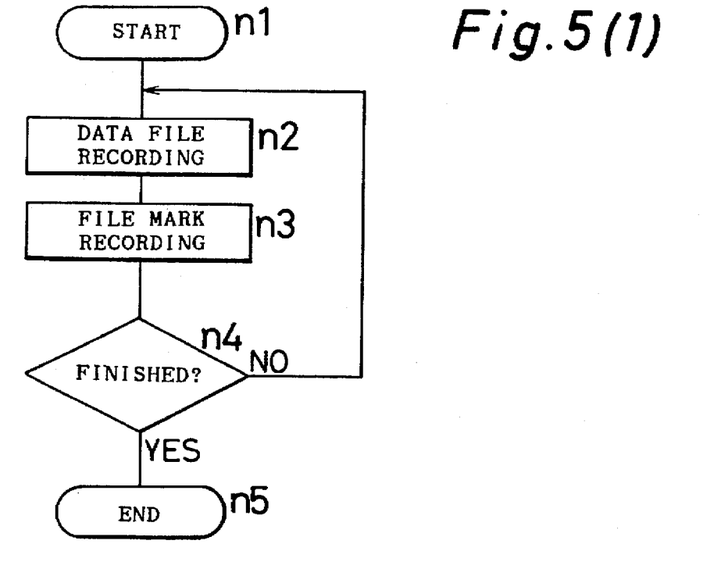

FIG. 5 is a flow chart showing the process of the data recording method in this embodiment. The data recording method of this embodiment is explained below referring also to FIG. 4.

To begin with, in the data recording operation of FIG. 5(1), following the start at step n1, at step n2 data files are first recorded on the magnetic tape T, on which no other recording has been made, as shown in FIG. 4(1). In other words, data processed by the signal processing circuit 5 is sequentially written on the magnetic tape T by the recording heads W1 and W2 on the rotating drum 2 in the write/read circuit 1. Then, each of the data files F(i−1), F(i) and F(i+1), recorded on the magnetic tape T as in FIG. 4(1), represent collections of related data.

Each data file is comprised of a plurality of data blocks, having as their components data blocks to which parity has been added for error detection/correction. In the case of data file F(i) for example, it is comprised of six data blocks Di0, Di1, Di2, Di3, Di4 and Di5, which are recorded in this order on the magnetic tape T.

At the next step n3, a file mark M is recorded following the recording of one data file, in order to distinguish that data file from the next data file which is recorded. It is confirmed by the determination at step n4 whether or not all of the data files have been recorded, and when it is determined that recording is not finished, the operations of steps n2 and n3 are repeated. By this means, each of the data files F(i−1), F(i), F(i+1), . . . are sequentially recorded on the magnetic tape T. Again at step n4, when it is determined that all of the data files have been recorded, processing moves to step n5 and the data recording operation is completed.

Next, in the data rewriting operation of FIG. 5(2), at steps n7, n8 and n9, a voluntarily selected data file from among the data recorded on the above mentioned magnetic tape T, for example data file F(i), is updated by another data file F(I), which has a data quantity 2 blocks smaller than data file F(i), as shown in FIG. 4(2). Then, the newly rewritten data file F(I) is comprised of four data blocks DI0 through DI3.

First at step n7, a search is carried out for the data file F(i) which is to be rewritten. At step n8, from among the data blocks Di0 through Di5 which comprise the old data file F(i), the four data blocks Di0 through Di3 are rewritten by blocks DI0 through DI3 which comprise the new data file. In other words, even in this case, the data to be written is processed by the signal processing circuit 5, and sequentially written on the magnetic tape T by the recording heads W1 and W2 of the write/read circuit 1.

At the next step n9, the data blocks Di4 and Di5, which were not updated and remain in the old data file F(i), are rewritten into unrecorded areas NR which contain no other data. An unrecorded are NR is formed by recording a flag in said area which indicates that it is an unrecorded area, or may be overwritten by a meaningless signal in the data area. As a result, there is no remnant of old data in the new data file F(I). After this, the data recording process is completed at step n11.

On the other hand, when the rewritten data file F(I), as shown in FIG. 4(2), is read by the above mentioned data recording/reproducing apparatus, the unnecessary data blocks Di4 and Di5 of the old data file F(i) have been eliminated, since these recorded areas were rewritten into the unrecorded areas NR. Because of this, controlling to distinguish between new data and old data is unnecessary, and there is no need to refer to a directory. In other words, the reading of data becomes possible without relying on a directory.

Figure 6:
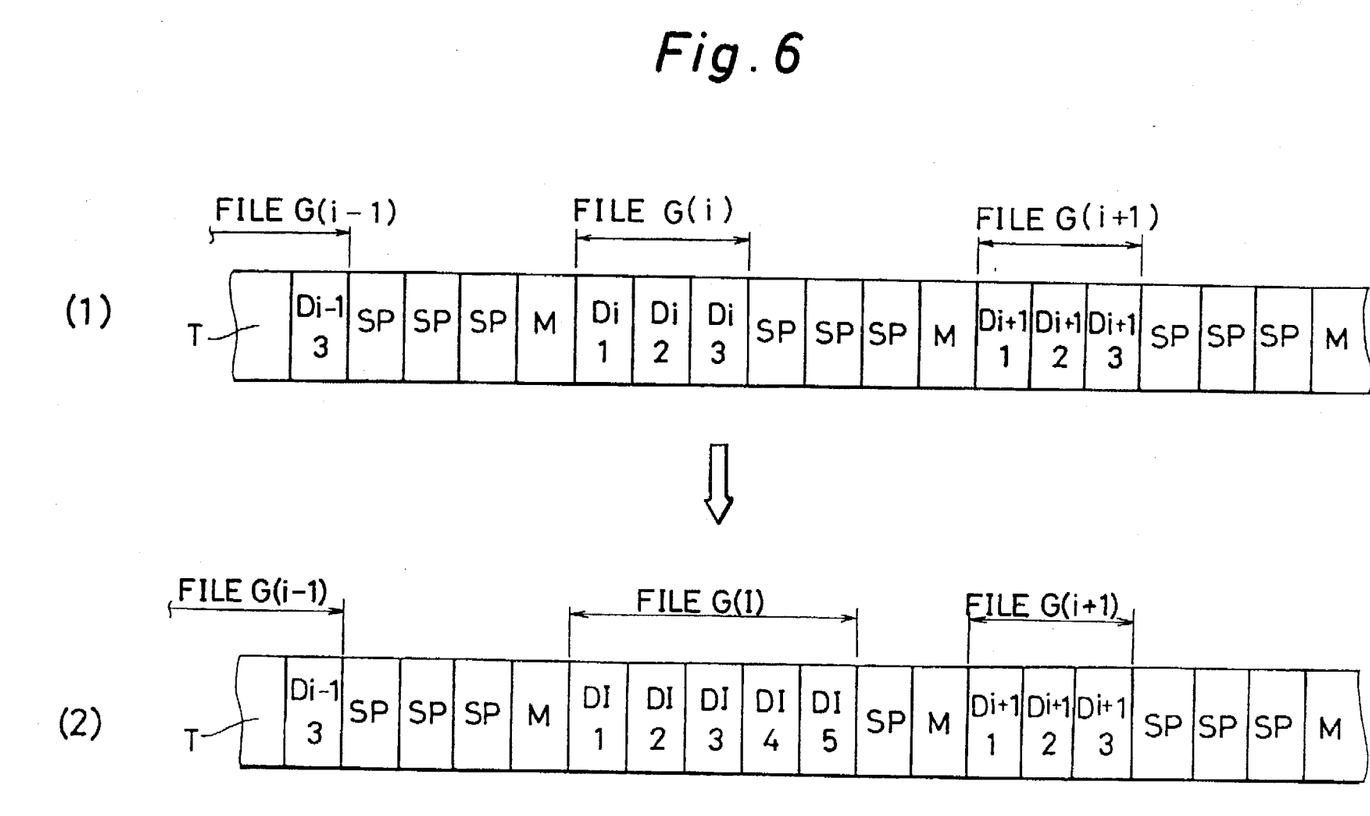

FIG. 6 is a schematic diagram showing the arrangement of data recorded on a magnetic tape T, which is a recording medium, according to a data recording method which is another embodiment of the invention. Within the figure, FIG. 6(1) shows the arrangement of data first recorded on the magnetic tape T on which no other data has been recorded, and FIG. 6(2) shows the arrangement of data when a voluntarily selected data file G(i), which has been recorded on that magnetic tape T, is updated with another data file G(I), which has a different data quantity.

Figure 7:
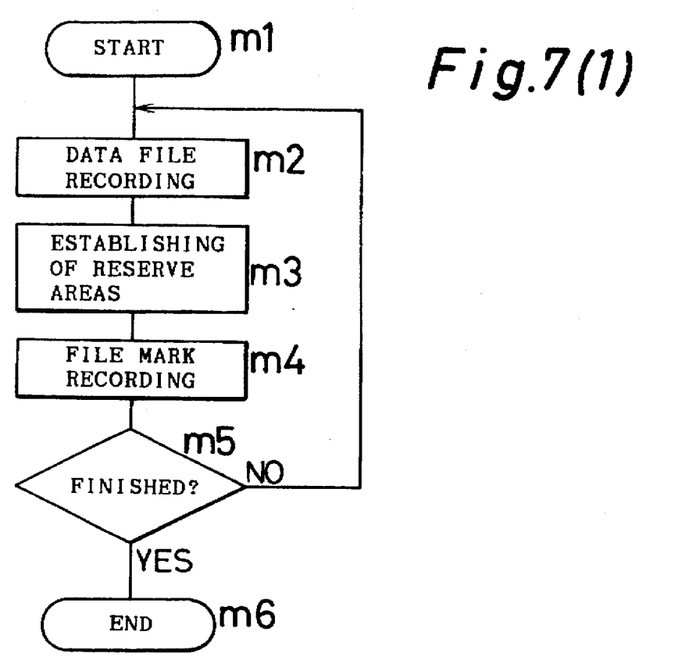

FIG. 7 is a flow chart showing the process of the data recording method in this embodiment. The data recording method of this embodiment is explained below referring also to FIG. 6.

To begin with, in the data recording operation of FIG. 7(1), following the start at step m1, at step m2 data files are first recorded on the magnetic tape T, on which on other recording has been made, as shown in FIG. 6(1). In other words, data processed by the signal processing circuit 5 is sequentially written on the magnetic tape T by the recording heads W1 and W2 on the rotating drum 2 in the write/read circuit 1. Then, each of the data files G(i−1), G(i) and G(i+1), recorded on the magnetic tape T as in FIG. 6(1), represent collections of related data.

Each data file is comprised of a plurality of data blocks, having as their components data blocks to which parity has been added for error detection/correction. In the case of data file G(i) for example, it is comprised of three data blocks Di1, Di2 and Di3, which are recorded in this order on the magnetic tape T.

At the next step m3, reserve areas SP, consisting of three data blocks having no recordings, are added following the recording area of the data file as an area belonging to the data file.

At the next step m4, a file mark M is recorded following the recording of one data file, in order to distinguish that data file from the next data file which is recorded. It is confirmed by the determination at step m5 whether or not all of the data files have been recorded, and when it is determined that recording is not finished, the operations of steps m2 through m4 are repeated. By this means, each of the data files G(i−1), G(i), G(i+1), . . . are sequentially recorded on the magnetic tape T. Again at step m5, when it is determined that the data file recording operation has been finished, processing moves to step m6 and the data recording operation is completed.

Next, when rewriting of a desired data file is performed from among the data files which are previously written on the magnetic tape T, after the start at step m7, search of the data file to be rewritten is performed at step m8, as shown in FIG. 7(2). When the desired data file, for example data file G(i), is found, it is updated and rerecorded as a new data file G(I), which has a greater data quantity than the old data file G(i), as shown in FIG. 6(2). Here, because the new data file G(I) has a data quantity of two data blocks more than the old data file G(i) prior to rewriting, the three data blocks DI1, DI2 and DI3 of the new data file G(I) are written on top of the old data. The remaining two data blocks DI4 and DI5 of the new data file G(I) are written into recording areas which were reserve areas SP prior to rewriting. Next at step m10, it is determined whether or not all rewriting has been completed for the data files which are to be rewritten, and when rewriting has not been completed, the operations of steps m8 and m9 are repeated. By this means, other desired data files can also be sequentially rewritten into new data files. Again at step m10, when it is determined that rewriting is finished, it moves to step m11, and the process of data recording is completed.

Proceeding in this way, the new data file G(I) and its corresponding file mark M can be recorded without overlapping onto the next data file G(i+1).

Moreover, in the above mentioned embodiment, a case was shown wherein an area of three data blocks was allotted for the reserve area SP, but in general, an area of any integral number of data blocks may be allotted for the reserve area SP.

Figure 8:
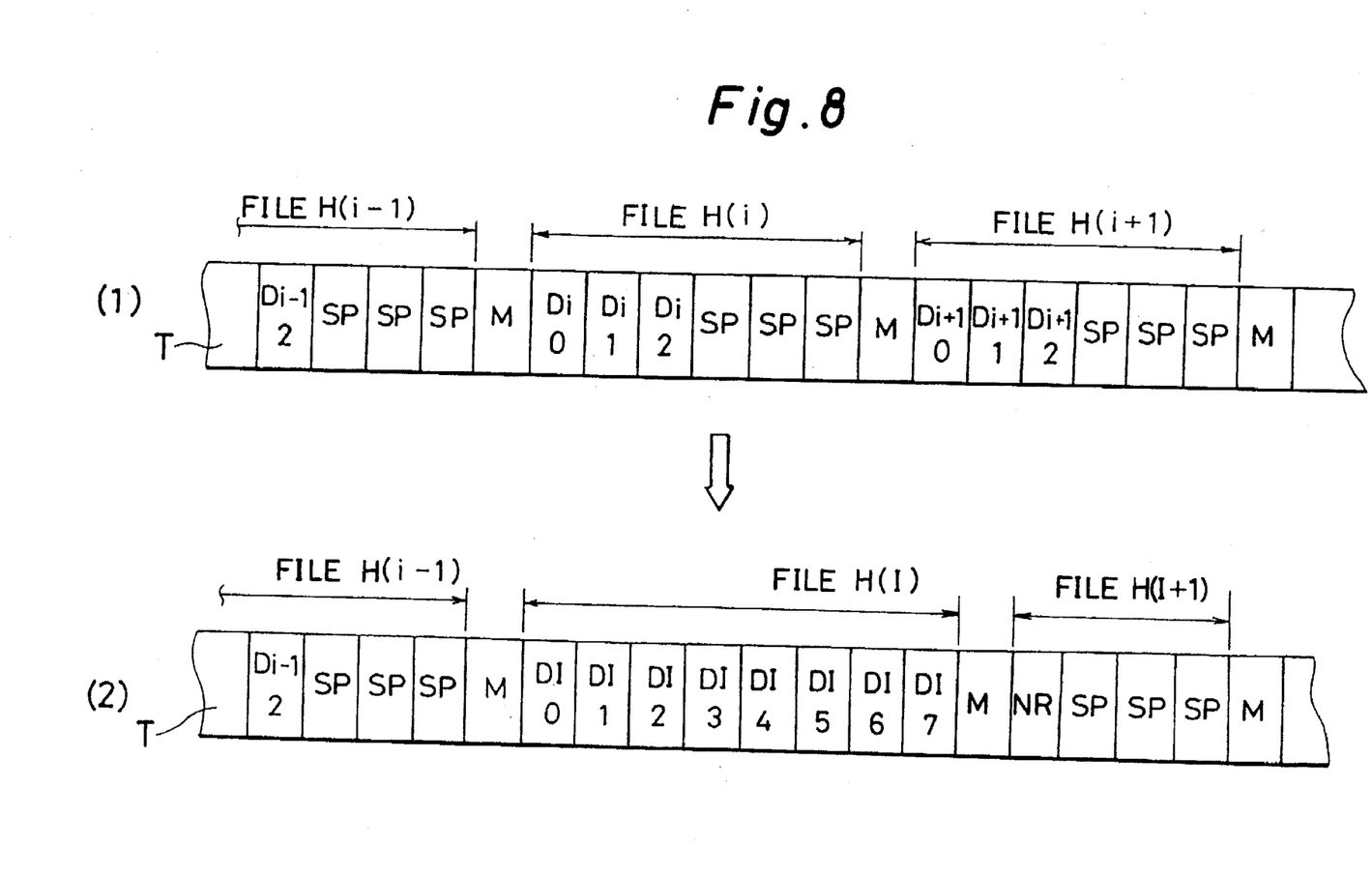

FIG. 8 is a schematic diagram showing the arrangement of data recorded on a magnetic tape T according to a data recording method which is another embodiment of the invention. Within this figure, FIG. 8(1) shows the arrangement of data first recorded on the magnetic tape T on which no other data has been recorded, and FIG. 8(2) shows the arrangement of data when a voluntarily selected data file H(i), which has been recorded on that magnetic tape T, is rewritten by another data file H(I), which has a greater data quantity.

Figure 9:
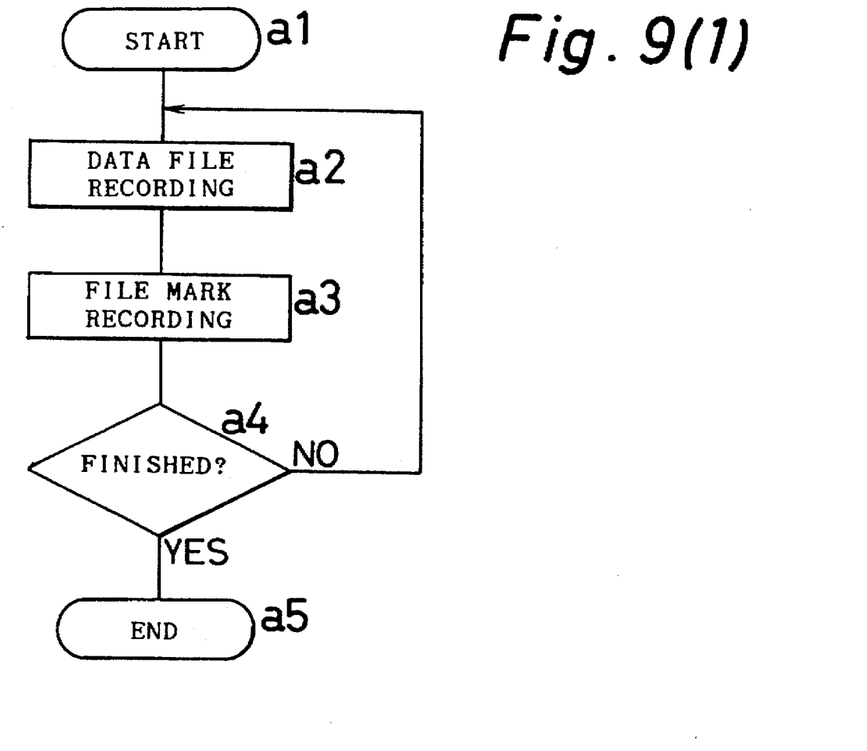

FIG. 9 is a flow chart showing the process of the data recording method in this embodiment. The data recording method of this embodiment will be explained referring also to FIG. 8.

To begin with, in the data recording operation of FIG. 9(1), following the start at step a1, at step a2 data files are first recorded on the magnetic tape T, on which no other recording has been made, as shown in FIG. 8(1). In other words, data processed by the signal processing circuit 5 is sequentially written on the magnetic tape T by the recording heads W1 and W2 on the rotating drum 2 in the write/read circuit 1. Then, each of the data files H(i-1), H(i) and H(i+1), recorded on the magnetic tape T as in FIG. 8(1), represent collections of related data.

Each data file is comprised of a plurality of data blocks, having as their components data blocks to which parity has been added for error detection/correction. In the case of data file H(i) for example, it is comprised of three data blocks Di0, Di1 and Di2, but here following these recording areas, the reserve areas SP, consisting of three data blocks having no recordings, are added as an area belonging to the data file H(i).

At the next step a3, a file mark M is recorded following the recording of one data file, in order to distinguish that data file from the next data file which is recorded. It is confirmed by the determination at step a4 whether or not all of the data files have been recorded, and when it is determined that recording is not finished, the operations of steps a2 and a3 are repeated. By this means, each of the data files H(i-1), H(i), H(i+1), . . . are sequentially recorded on the magnetic tape T. Again at step a4, when it is determined that all of the data files have been recorded, processing moves to step a5 and the data recording operation is completed.

Next, in the data rewriting operation of FIG. 9(2), a voluntarily selected data file from among the recorded data on the above mentioned magnetic tape T, for example data file H(i) is updated and rerecorded by another data file H(I) which has a larger data quantity, as shown in FIG. 8(2). Then, assuming that the next data file H(i+1) is an unnecessary file, the rewritten data file H(I) will be comprised of the eight data blocks DI0 through DI7.

First the operation begins at step a6, and at step a7 a new data file H(I) is sequentially written across the recording areas of the data file H(i), the file mark M and the first data block, D(i+1), 0, of the next data file H(i+1), that existed prior to rewriting. In other words, in this case too, the data to be written is processed by the signal processing circuit 5, and sequentially written on the magnetic tape T by the recording heads W1 and W2 of the write/read circuit 1.

At the next step a8, one data block, D(i+1), 1, which was not rewritten and remains in the next data file H(i+1), is rewritten into the file mark M, and the further remaining single data block, D(i+1), 2, is rewritten into the unrecorded area NR. As a result, another data file H(I+1), comprised of one data block of an unrecorded area NR and three data blocks of reserve areas SP, is recorded following the new data file H(I). After this, the data recording process is finished at step a9.

In this way, because the rerecording of the new data file H(I) is processed so that no old data remains, there is no reading of unnecessary old data when this new data file H(I) is read, and therefore it becomes possible to effectively utilize the rewritten data file H(I).

Figure 10:
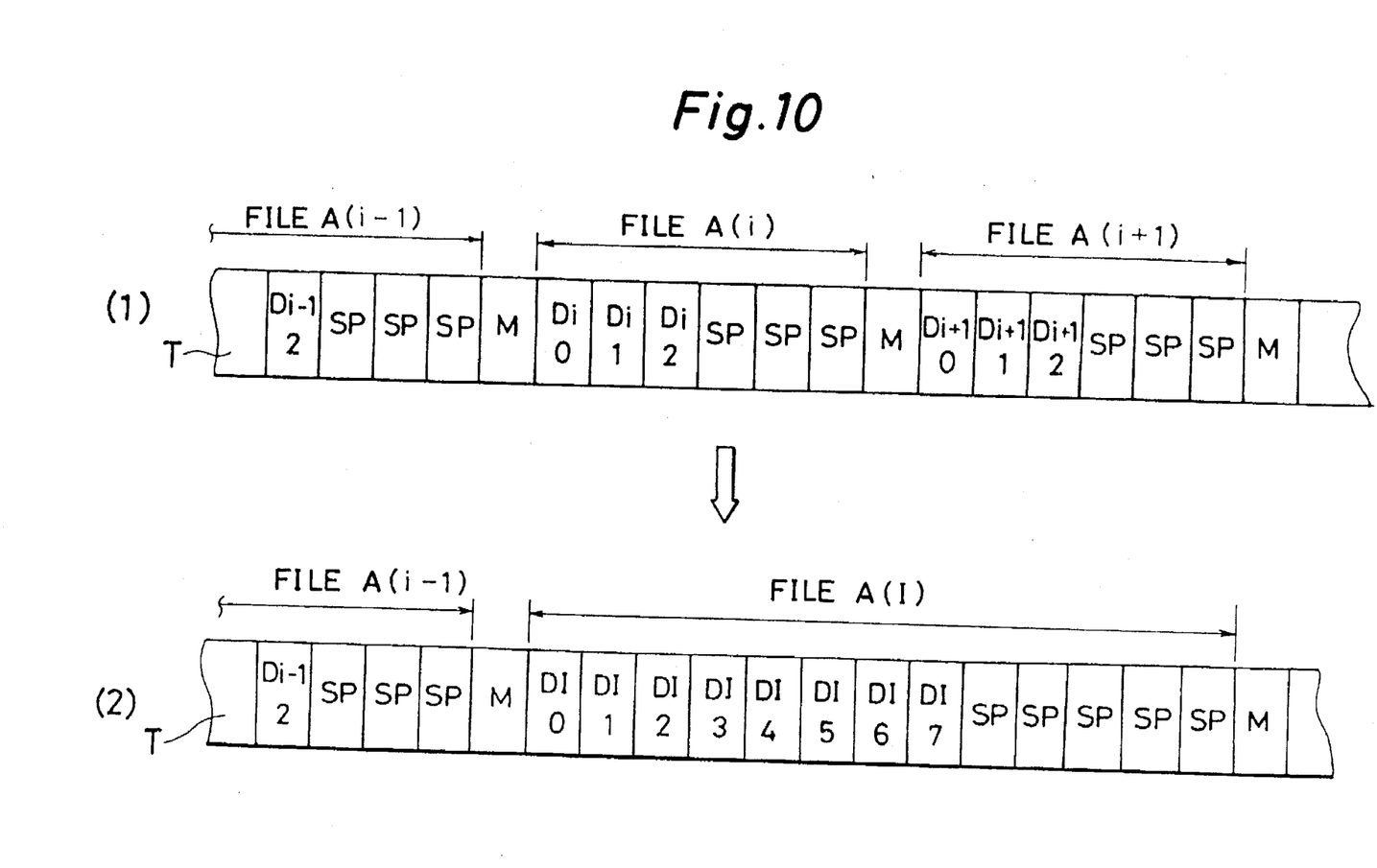

FIG. 10 is a schematic diagram showing the arrangement of data recorded on a magnetic tape T according to a data recording method which is another embodiment of the invention. Within this figure, FIG. 10(1) shows the arrangement of data first recorded on the magnetic tape T on which no other data has been recorded, and FIG. 10(2) shows the arrangement of data when a voluntarily selected data file A(i), which has been recorded on that magnetic tape T, is rewritten into another data file A(I), which has a greater data quantity.

FIG. 11 is a flow chart showing the process of the data recording method in this embodiment. The data recording method of this embodiment will be explained referring also to FIG. 10.

Following the start at step b1, at step b2 data files are first recorded on the magnetic tape T, on which no other recording has been made, as shown in FIG. 10(1). In other words, data processed by the signal processing circuit 5 is sequentially written on the magnetic tape T by the recording heads W1 and W2 on the rotating drum 2 in the write/read circuit 1. Then, each of the data files A(i-1), A(i) and A(i+1), recorded on the magnetic tape T as in FIG. 10(1), represent collections of related data.

Each data file is comprised of a plurality of data blocks, having as their components data blocks to which parity has been added for error detection/correction. In the case of data file A(i) for example, it is comprised of three data blocks Di0, Di1 and Di2, but here following these recording areas, the reserve areas SP, consisting of three data blocks having no recordings, are added as an area belonging to the data file A(i).

At the next step b3, a file mark M is recorded following the recording of one data file, in order to distinguish that data file from the next data file which is recorded. At step b4 it is determined whether or not the recording of all data files has been completed, and each of the data files A(i-1), A(i), A(i+1), . . . are sequentially recorded on the magnetic tape T by repetition of the operations at steps b2 and b3, until completion has been confirmed.

At the next steps b5 and b6, a voluntarily selected data file from among the data recorded on the above mentioned magnetic tape T, for example data file A(i), is rewritten and rerecorded by another data file A(I) which has a greater data quantity, as shown in FIG. 10(2). Then, assuming that the next data file A(i+1) is an unnecessary file, the rewritten data file A(I) will be comprised of the eight data blocks DI0 through DI7.

First at step b5, the new data file A(I) is sequentially written across the recording areas of the data file A(i), the file mark M and part of the next data file A(i+1), which existed prior to rewriting. In other words, in this case too, the data to be written is processed by the signal processing circuit 5, and sequentially written on the magnetic tape T by the recording heads W1 and W2 of the write/read circuit 1.

At the next step b6, the data blocks which were not rewritten, and remain in the next data file A(i+1), are rewritten into reserve areas SP. The rewritten reserve area SP and the reserve areas SP which remained, having not been rewritten, become areas belonging to the new data file A(I). As a result, no old data remains in the new data file A(I). At the next step b7 all data recording processes are finished.

In this way, because the rerecording of the new data file A(I) is processed so that no old data remains, there is no reading of unnecessary old data when this new data file effectively utilize the rewritten data file A(I).

Moreover, in each of the above mentioned embodiments, cases were explained wherein the reserve areas SP were provided following the data blocks in the data files which were first recorded on the magnetic tape T, but even in cases where the reserve areas SP are not added to the data files which are first recorded, it is possible to perform rerecording in the same way. However, in a case where the reserve areas SP are added to the data files which are first recorded, then when rewriting is performed by a data file having a data quantity greater than that of the data file prior to rewriting, and if the new data file is of a data area which can be accommodated within the range of the reserve areas SP, this is advantageous from the standpoint that rerecording can be accomplished without destroying the next data file.

In each of the above mentioned embodiments, one entire data block is allotted for the file mark M, however as another embodiment of the invention, a file mark M may also be indicated by a flag (which actually does not occupy any area) within a block (the end of the actual file data), as shown in FIG. 12. In this way, it becomes unnecessary to use a particularly large area for a file mark, and it is possible to treat this as one data block including the file mark M.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data recording medium for a sequentially accessed recording/reproducing medium, said method comprising:

sequentially recording data files including at least B(i−1), B(i) and B(i+1) onto said medium, each said data file comprising one or more related data blocks;

recording an updated file B(I) comprising one or more related data blocks in place of the original file B(i) in a position on said medium which was at least in part occupied by said original file B(i) without leaving any portion of the originally recorded file B(i) on said medium when the new file B(I) is longer than the original file B(i) and when the new file B(I) is shorter than the original file B(i).

2. A data recording method for a recording medium including a recording track used in a sequential access type data recording/reproducing apparatus which reads-out object recorded data in the recording order comprising:

providing recording areas and unrecorded reserve areas on the recording track, each of the recording areas including a data file wherein every recording of a data file is a collection of related data and wherein the unrecorded reserve areas follow and are associated with each of the plurality of recording areas when the data is first recorded on the recording medium; and selecting a data file recorded on the recording medium for updating by another data file having a particular recorded order and having a greater data quantity than the selected data file, and writing the data from said another file which is greater in quantity than said selected data file into the recording area containing the selected data file and into said reserve areas associated with the selected data file and in said particular recorded order without leaving any portion of the originally recorded selected file on the recording medium.

3. A data recording apparatus which sequentially records recording data on a track of a recording medium in a recording order, comprising:

means for providing recording areas and unrecorded reserve areas on the track of said medium wherein the reserve areas follow and are associated with each of the recording areas, each said recording area including a data file wherein every recording of a data file is a collection of related data, when the data is first recorded on the recording medium; and means for selecting a data file recorded on the recording medium for updating by another data file having a particular recorded order and having a greater data quantity than the selected data file and means for writing the data from said another file which is greater in quantity than the selected data file into the recording area containing the selected data file and into said reserve areas and in said particular recorded order without leaving any portion of the originally recorded selected file.

4. A data recording method for a recording medium used in a sequential access type data recording/reproducing apparatus which reads-out object recorded data in the recorded order, comprising:

recording file marks at the time data is first recorded on said recording medium for marking every data file on said record, wherein each said data file is a collection of related data, in order to distinguish each data file from other data files;

selecting a data file recorded on the recording medium for rewriting by another data file, said another data file having a data quantity greater than said selected data file;

writing the data from the another data file which is greater in quantity than said selected data file into at least a part of a further data file in an area of the recording medium which included and is adjacent to the file mark of said selected data file; and rewriting the area of said further data file which was not rewritten by said another data file, as a new data file containing no data.

5. A data recording apparatus which sequentially records or reproduces data on a recording medium in a recording order comprising:

means for recording file marks at the time data is first recorded on a recording medium for marking every data file on said record, wherein each said data file is a collection of related data, in order to distinguish each data file from other data files;

means for selecting a data file recorded on the recording medium for rewriting by another data file, said another data file having a data quantity greater than said selected data file;

means for recording the data from the another data file which is greater in quantity than said selected data file into at least a part of a further data file in an area of the recording medium which included and is adjacent to the file mark of said selected data file; and means for rewriting the area of said further data file which was not rewritten by said another data file, as a new data file containing no data.

6. A data recording medium for a recording medium used in a sequential access type data recording/reproducing apparatus which reads-out object recorded data in the recorded order, comprising:

recording file marks at the time data is first recorded on a recording medium for marking every data file on said record, wherein each said data file is a collection of related data, in order to distinguish each data file from other data files;

selecting a data file recorded on the recording medium for rewriting by another data file, said another data file having a data quantity greater than said selected data file;

writing the data from the another data file which is greater in quantity than said selected data file into at least a part of a further data file in an area of the recording medium which included and is adjacent to the file mark of said selected data file; and rewriting the area of said further data file which was not rewritten by said another data file, as an unrecorded reserve area associated with said another data file, so that said unrewritten reserve area contains no data.

7. A data recording apparatus which sequentially records or reproduces data on a recording medium in a recording order, comprising:

means for recording file marks at the time data is first recorded on a recording medium for marking every data file on said record, wherein each said data file is a collection of related data, in order to distinguish each data file from other data files;

means for selecting a data file recorded on the recording medium for rewriting by another data file, said another data file having a data quantity greater than said selected data file;

means for writing the data from the another data file which is greater in quantity than said selected data file into at least part of a further data file in an area of the recording medium which included and is adjacent to the file mark of said selected data file; and means for rewriting the area of said further data file which was not rewritten by said another data file, as an unrecorded reserve area associated with said another data file, so that said unrewritten reserve area contains no data.

* * * * *